May 6, 1952 — S. KISS — 2,595,529
UNIVERSAL JOINT
Filed June 2, 1950 — 2 SHEETS—SHEET 1

INVENTOR.
Steve Kiss
BY Boyle & Blair
Attorneys

May 6, 1952        S. KISS        2,595,529
UNIVERSAL JOINT
Filed June 2, 1950        2 SHEETS—SHEET 2
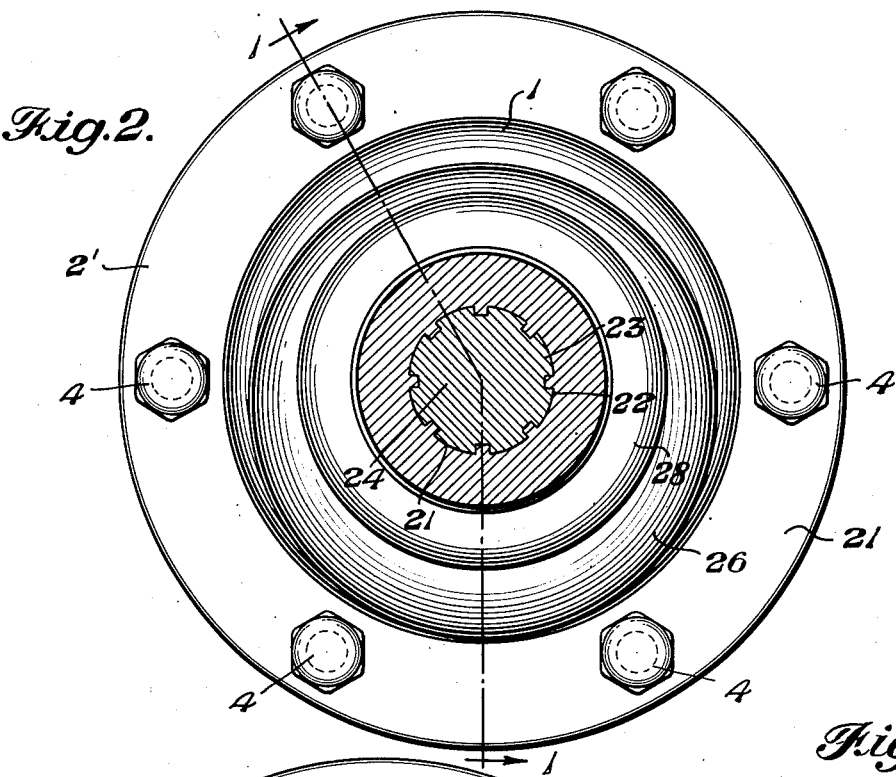
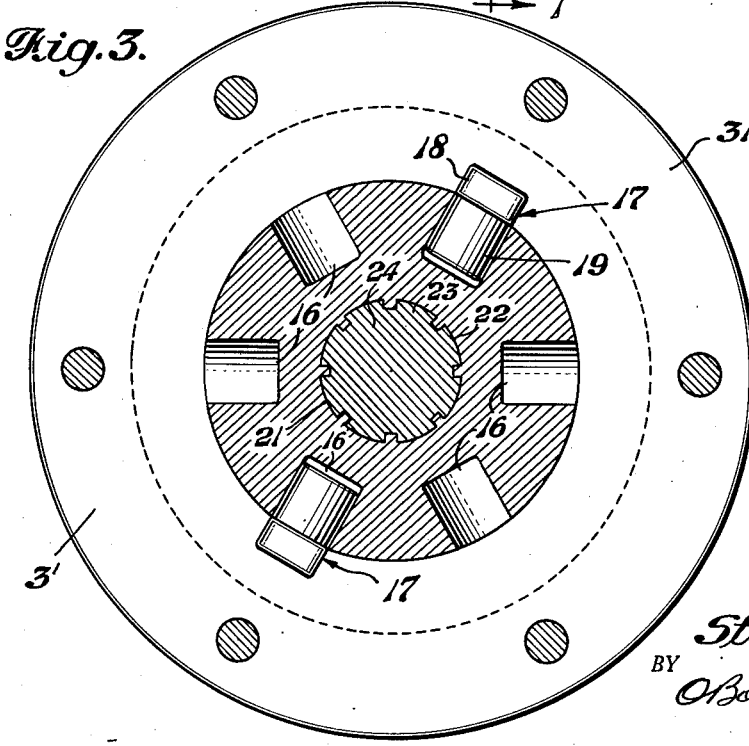
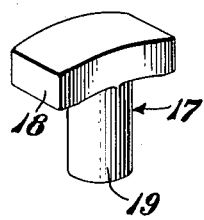
INVENTOR.
Steve Kiss
BY
O'Boyle + Blair
Attorneys Patented May 6, 1952

2,595,529

UNITED STATES PATENT OFFICE 2,595,529

UNIVERSAL JOINT

Steve Kiss, Miami, Fla.

Application June 2, 1950, Serial No. 165,655

2 Claims. (Cl. 64—7)

My invention relates to a flexible power transmission arrangement, and more particularly to an improved universal joint of the ball and socket type.

The transmission arrangement of the present invention is designed for use with automobiles, trucks, boat or ship propellers and other machinery of various classes, and consists essentially of an improved flexible coupling in the form of a universal joint of the ball and socket type. The coupling comprises a substantially spherical shaped housing having a ball member positioned therein, the ball being slidably keyed to the housing by means of a plurality of keys arranged in spaced relation about a great circle of the ball, the keys being supported in suitable recesses formed in the surface of the ball, the head portions of the keys being adapted to slide in complementary grooves formed in the inner surface of the spherical housing. The ball is further provided with a central bore to receive the end portion of a shaft which extends through the housing, the shaft being adapted for connection to a driving or driven member.

In the embodiment of the invention disclosed herein the device is shown as used with an automobile transmission; however, it will be understood that this showing is for purposes of illustrating one example of its use, since the device is of general application in connection with power transmission installations which require a flexible coupling. When used with an automobile transmission, the spherical housing of the coupling member is secured to the transmission disc or plate and the shaft associated with the ball is connected by means of a sliding-drive fit to the differential drive shaft.

An object of my invention is to provide an improved flexible power transmission arrangement adapted for use with vehicles generally, automobiles, trucks, and the like; machinery, propellers, shafting and various other mechanical devices.

Another object of my invention is to provide an improved universal joint.

Yet another object of my invention is to provide an improved universal joint adapted for use with a single or double shaft.

Still another object of my invention is to provide an improved universal joint of the ball and socket type, wherein the ball is provided with a drive shaft adapted to seat in a central bore or opening formed in the ball.

A further object of my invention is to provide an improved universal joint of the ball and socket type, wherein the ball is provided with a plurality of diametrically opposite openings adapted to receive keying members, said openings being arranged in spaced relation about a great circle of the ball, the socket member being formed with a plurality of complementary grooves adapted to receive the heads of the keying members, whereby relative angular movement is permitted between the ball and the socket.

Yet a further object of my invention is to provide an improved flexible power transmission arrangement, wherein the axes of the driving and driven elements may move into angular relationship, the drive shaft associated with the driven element being constructed and arranged for longitudinal movement with respect to the member to which it is operatively connected.

A still further object of my invention is to provide improved flexible power transmission arrangement which is strong and sturdy in construction, consisting of relatively few parts, and not liable to get out of order even after long and continued use.

With these and other objects in view, which may be incident to my improvements, the invention consists in the parts and combinations to be hereinafter set forth and claimed, with the understanding that the several necessary elements comprising my invention may be varied in construction, proportions and arrangements, without departing from the spirit and scope of the appended claims.

In order to make my invention more clearly understood, I have shown in the accompanying drawings means for carrying the same into practical effect, without limiting the improvements in their useful applications to the particular constructions, which for the purpose of explanation, have been made the subject of illustration.

In the drawings:

Fig. 2 is an end view, partly in section, of the transmission arrangement shown in Fig. 1;

Fig. 3 is a sectional view along line 3—3 of Fig. 1, and

Fig. 4 is a perspective view of a key member.

Figure 1:
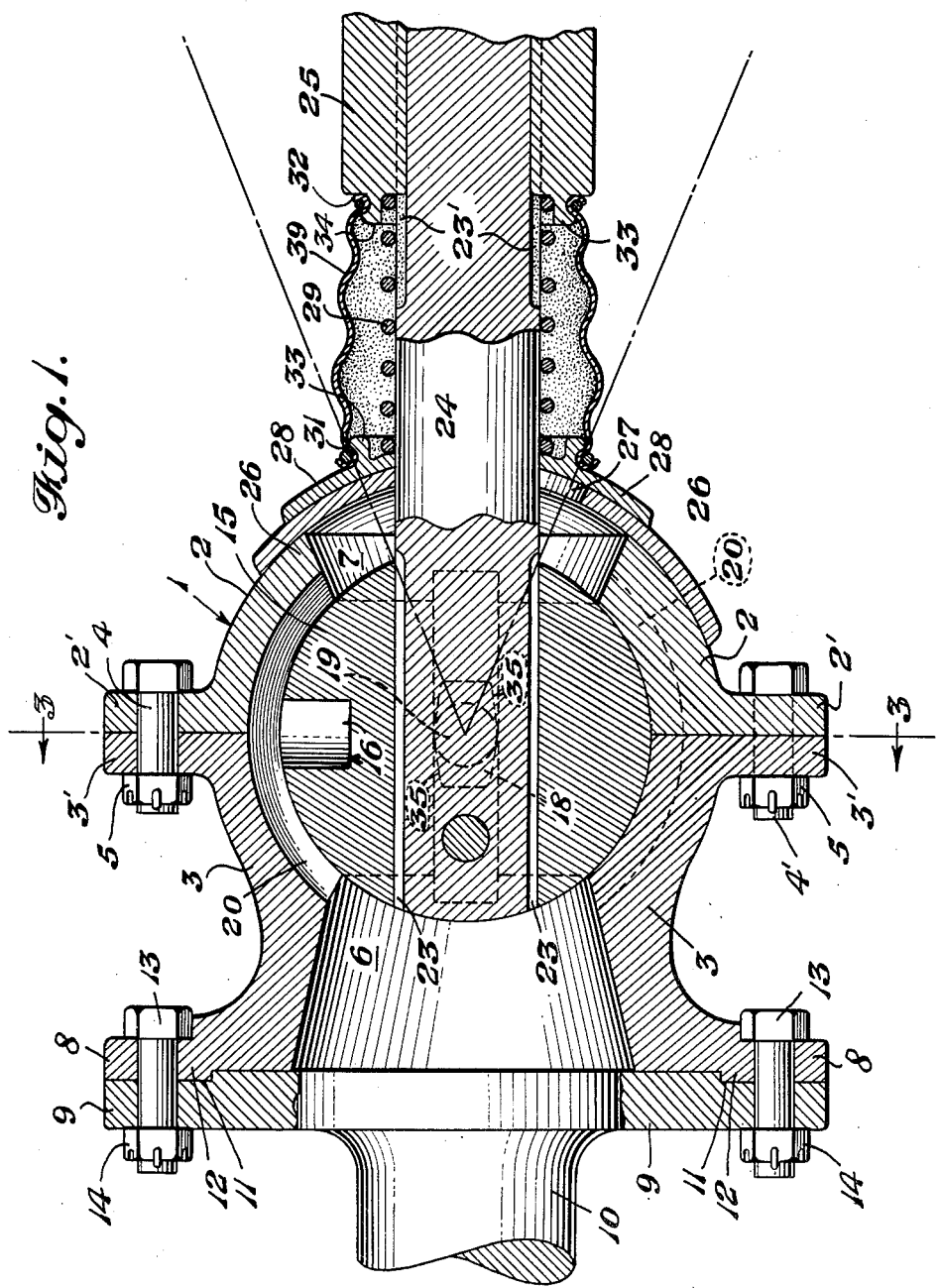
Figure 1 is a rotated cross-sectional view taken on line 1—1 of Fig. 2.

Referring to the drawings, and more particularly to Fig. 1 thereof, the improved flexible transmission arrangement comprises a substantially spherical shaped housing designated generally by the numeral 1, formed of two parts or segments 2 and 3, having flange portions 2' and 3' provided with registering openings to receive bolts 4, whereby the parts of the housing are securely clamped together. The bolts are of conventional construction, having threaded end portions to receive suitable nuts 5 which may be keyed to the bolt by means of a cotter pin or the like, to prevent accidental reverse rotation of the nuts. In connection with the construction of the housing, it will be noted that it is provided with openings 6 and 7, at diametrically opposite points, that is to say, it is formed with a through passage, the purpose of which will be described more fully hereinafterwards.

Adjacent the opening to the interior of the housing, members 3 are flared outwardly and terminate in a flange portion 8, constructed and arranged to abut a disc or plate 9 attached to a shaft 10 of an automobile transmission, not shown. The peripheral portion of the disc 9 is recessed as at 11, to receive a ridge or enlargement 12 formed on the inner peripheral surface of the flange 8, the flange portions 8 and 9 of the housing and automobile transmission, respectively, being bolted together by means of bolts 13, having threaded portions to receive suitable nuts 14.

Positioned within the housing is a ball member 15, of diameter slightly less than the inner diameter of the housing. The ball is formed with a plurality of recesses 16 (Fig. 3) arranged in spaced relation about a great circle of the ball, the recesses being designed to provide seats for keying members 17, which rest in the recesses, as shown. Each of the keying members 17 (Fig. 1) comprises an arcuate shaped head portion 18 and a substantially cylindrical shaped shank portion 19. The inner spherical surface of the housing is provided with a plurality of complementary grooves or slots 20 adapted to receive the head portions 18 of the keying members. By means of the above described arrangement, the ball and the housing are slidably keyed together and relative rotational movement therebetween, as desired, may be obtained.

The ball is further provided with a central bore 21 (Figs. 2 and 3) having longitudinal grooves 22 formed therein, adapted to receive splines 23, formed on the end portion of a shaft 24. The opposite end of the shaft is also formed with splines 23', adapted to seat in suitable grooves formed in the inner surface of a differential drive shaft 25. The ball may be keyed to the shaft by means of a pin or other suitable fastening device, and in order to seal the housing in the vicinity of the opening 7, through which the shaft 24 passes, there is provided an inner arcuate shaped member 26 having an opening 27 larger than the diameter of the shaft, and an outer member 28, movable with the shaft, the outer member being adapted to cover the opening 27 when the shaft is angularly moved with respect to the housing. To maintain the members 26 and 28 in tight sealing contact, there is provided a coil spring 29, interposed between the end of shaft 25 and member 28. Spring 29 is also adapted to urge the shaft 25 into its normal operative position on shaft 24. A dust seal in the form of a boot 30 surrounds the spring, the end portions of the boot being seated in grooves 31 and 32, of extensions 33 and 34, formed on member 28 and shaft 25, respectively.

Concerning the construction and arrangement of the housing and the ball, and more particularly the design of the grooves and keying members, it will be noted (Fig. 1) that the head 18 of each key is formed with a taper as at 35 in the vicinity of the end of the head, whereby to permit free movement of the head along the groove within which it is seated. In other words the ends of the heads are tapered slightly inwardly in order to prevent binding during the periods in which they slide lengthwise of the complementary slots or grooves formed in the inner surface of the housing. With reference to the number of keying members to be used, it is well known that in order to obtain the desired maximum angular displacement of the ball with respect to the housing, only two keys can be used. When more than two keys are used, in the absence of a loose fit, the angular displacement is reduced to zero.

It is believed that the operation of the device will be readily understood. When the driving member 10 is rotated, rotary motion is imparted to the housing, and through the medium of the keying arrangement, the ball 15, together with shafts 24 and 25 are rotated. In the event the differential shaft 25 is subjected to shock of a nature such as to normally cause it to move out of alignment, that is to say, cause a shortening of its effective length, it can move longitudinally on shaft 24 in the vicinity of the splined portion.

In assembling the device, it will be understood that the split housing permits ready positioning of the ball therein and the shaft 24 may be arranged at the desired driving angle for coupling to the driven member. It will be further understood the housing is provided with a suitable grease cup or cups for the introduction of lubricants to the moving parts of the coupling.

The invention has been described as used with a double shaft arrangement, however, as indicated hereinbefore it is equally adapted for use with a single shaft. When used with a single shaft, the housing may become the driven member and the shaft, which extends completely through the housing, becomes the driving member. It is for this reason that the housing is provided with a through passage.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention or exceeding the scope of the appended claims.

I claim:

1. A power transmission device of the character described, including a driving element and a driven element, a substantially spherical shaped housing secured to the driving element, said housing having openings therein at diametrically opposite points, a ball of diameter slightly less than the inner diameter of the housing positioned within the housing, means for slidably keying the ball to the housing, comprising a pair of key members mounted on the ball in spaced relation about a great circle thereof, and complementary key receiving grooves formed in the inner spherical surface of the housing, each of said key members having a cylindrical shaped shank and an arcuate substantially rectangular shaped head portion, the length of the head being greater than the diameter of the shank and the width of the head being equal to the shank diameter, said ball having a central bore adapted to receive a drive shaft, a drive shaft extending through one of the openings in the housing and having its end portion seated in the central bore of the ball, means to seal the housing in the vicinity of the opening through which the drive shaft passes, comprising an inner arcuate shaped member seated on the housing, said member having an opening larger than the diameter of the shaft, an outer complementary arcuate shaped member mounted on the shaft and in frictional engagement with the inner member, said outer member being movable with the shaft and adapted to cover the opening in the inner member when the shaft is angularly disposed with respect to the housing, and means to maintain said members in frictional engagement.

2. A power transmission device of the character described, including a driving element and a driven element, a substantially spherical shaped housing secured to the driving element, said housing having openings therein at diametrically opposite points, a ball of diameter slightly less than the inner diameter of the housing positioned within the housing, means for slidably keying the ball to the housing, comprising a pair of key members mounted on the ball in spaced relation about a great circle thereof, and complementary key receiving grooves formed in the inner spherical surface of the housing, each of said key members having a cylindrical shaped shank and an arcuate substantially rectangular shaped head portion, the end portions of said head being slightly tapered inwardly, the length of the head being greater than the diameter of the shank and the width of the head being equal to the shank diameter, said ball having a central bore adapted to receive a drive shaft, a drive shaft extending through one of the openings in the housing and having its end portion seated in the central bore of the ball, the opposite end of the drive shaft having a sliding-drive fit with the driven element, means to seal the housing in the vicinity of the opening through which the drive shaft passes, comprising an inner arcuate shaped member seated on the housing, said member having an opening larger than the diameter of the shaft, an outer complementary arcuate shaped member mounted on the shaft and in frictional engagement with the inner member, said outer member being movable with the shaft and adapted to cover the opening in the inner member when the shaft is angularly disposed with respect to the housing, and resilient means interposed between said outer member and the driven element whereby to maintain said arcuate shaped members in frictional engagement.

STEVE KISS.

REFERENCES CITED

The following references are of record in the file of this patent:

UNITED STATES PATENTS

| Number | Name | Date |
|---|---|---|
| 1,188,965 | Maxwell | June 27, 1916 |
| 2,033,583 | McCarrell | Mar. 10, 1936 |